United States Patent [19]
Burgio

[11] Patent Number: 4,738,234
[45] Date of Patent: Apr. 19, 1988

[54] PISTON-CONNECTING ROD UNIT
[75] Inventor: Antonio Burgio, Moncalieri, Italy
[73] Assignee: Fiat Auto S.p.A., Turin, Italy
[21] Appl. No.: 90,777
[22] Filed: Aug. 28, 1987
[30] Foreign Application Priority Data
   Sep. 2, 1986 [IT] Italy .............................. 53788/86[U]
[51] Int. Cl.⁴ .............................................. F02B 75/32
[52] U.S. Cl. ............................. 123/197 AB; 74/579 E
[58] Field of Search ......... 123/197 A, 197 AB, 41.38; 92/187; 74/579 E; 29/156.5 R, 156.5 A, 525
[56] References Cited
U.S. PATENT DOCUMENTS
  1,238,602 8/1917 Wanner ................................. 92/187
  2,379,359 6/1945 Kettering ............................... 92/187
  3,056,638 10/1962 Hovde ............................. 123/197 A
  4,406,558 9/1983 Kochendorfer et al. ......... 74/579 E Primary Examiner—Ira S. Lazarus
Assistant Examiner—M. Macy
Attorney, Agent, or Firm—Frost & Jacobs

[57] ABSTRACT

An improved piston-connecting rod unit is described comprising a piston provided with a seat housing a gudgeon pin, and a connecting rod having a small end into which a first bush is driven. The main characteristic of the present invention is that a second bush is driven over said gudgeon pin and is fitted idly into the first bush to form a floating connection between the gudgeon pin and connecting rod.

4 Claims, 1 Drawing Sheet

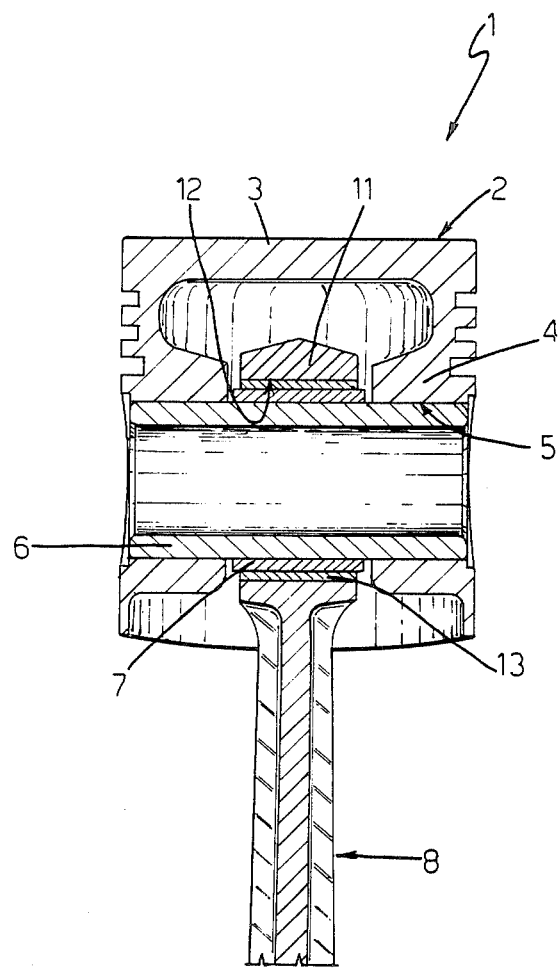

PISTON-CONNECTING ROD UNIT

BACKGROUND OF THE INVENTION

This invention relates to an improved piston-connecting rod unit. Such a unit is known to comprise a piston provided with a transverse seat in its side wall for a gudgeon pin which is fitted to the small end of a connecting rod usually in a floating manner, ie such as to allow the connecting rod small end to rotate freely relative to the piston.

Because of the high specific pressure exerted by the piston on the gudgeon pin and by the gudgeon pin on the cooncting rod, this type of connection requires either a very long gudgeon pin or, if this length has to be limited, a gudgeon pin of increased diameter with consequent increase in the alternating masses. Furthermore, when the gudgeon pin is of the floating type it is locked axially by two spring circlips, the presence of which however reduces the gudgeon pin bearing surfaces. On the other hand, if the gudgeon pin is forced into the connecting rod so that it is no longer floating, the result is permanent flexural deformation and ovalisation of the gudgeon pin, which can lead to piston fracture or seizing.

SUMMARY OF THE INVENTION

An object of the present invention is to provide an improved piston-connecting rod unit which is free of the aforesaid drawbacks by connecting the gudgeon pin to the connecting rod in such a manner that even if the allowable axial dimensions are limited, a gudgeon pin of reduced diameter can be used on which it is not necessary to use spring circlips for locking purposes. Further objects and advantages of the present invention will be apparent from the description given hereinafter.

The present invention provides an improved piston-connecting rod unit comprising a piston provided with a first seat housing a gudgeon pin, and a connecting rod having a small end in which there is provided a second seat into which a first bush is driven to form an interference fit, characterised in that a second bush is driven over said gudgeon pin to form an interference fit, and is idly housed within said first bush.

BRIEF DESCRIPTION OF THE DRAWING

The present invention will be more apparent from the description of a preferred embodiment thereof given hereinafter by way of non-limiting example with reference to the accompanying drawing, which shows a section through a piston-connecting rod unit indicated overall by 1.

DETAILED DESCRIPTION OF THE INVENTION

The unit 1 comprises a piston 2 having a head 3 and a skirt or side wall 4 in which a transverse seat 5 is provided for a gudgeon pin 6 of floating type, ie which can rotate about its longitudinal axis by virtue of a predetermined radial clearance provided between it and the seat 5. A bush 7 preferably of steel construction is driven over the central part of the gudgeon pin 6 to form an interference fit. The unit 1 also comprises a connecting rod 8 having its small end 11 provided with a seat or eye 12 into which a second bush 13 is driven to form an interference fit.

According to the invention, the bush 7 is housed coaxially and idly within the bush 13, ie between this latter and the bush 7 there is provided a clearance which enables the bush 13 and thus the gudgeon pin 6 to rotate articulatedly within the eye 12. It should also be noted that according to the invention the bush 7 is longer than the bush 13, which has a length substantially equal to the thickness of the connecting rod small end 11. During assembly, the bush 13 is firstly driven in known manner into the seat 12 to form an interference fit, and the bush 7 is then fitted into the bush 13 with a clearance fit by inserting it idly into this latter. Finally, the connecting rod small end 11 equipped in this manner is disposed inside the piston 2 with the bushes 7 and 13 coaxial to the seat 5, and with a single operation the gudgeon pin 6 is inserted into the seat 7 with an interference fit and inserted slidingly into the bush 5. The advantages obtained from the present invention are apparent from the aforegoing description and are numerous.

In particular, no spring circlips are provided in the unit 1. On the one hand this leads to an increase in the contact surface between the gudgeon pin 6 and its seat 5, and on the other hand reduces the cost of the unit 1 becaus of the smaller number of components used and the absence of special machining for forming the seats for the spring circlips. In addition, the contact surface between the gudgeon pin 6 and seat 5 is increased, as is the contact surface between the gudgeon pin 6 and the connecting rod 8 because the bush 7 increases the diameter of the gudgeon pin 6. It should be noted that the gudgeon pin 6 floats in the unit 1 by virtue of the fact that the bush 7 is idle within the connecting rod small end 11. This prevents flexural deformation and ovalisation of the gudgeon pin 6, so obviating the possibility of fracture and seizing of the piston 2. It should also be noted that the gudgeon pin 6 is retained in its seat 5 by the axial shoulder action excercised by the bush 7, of which those ends projecting beyond the bush 13 abut against the inner surface of the skirt 4. Finally, because of the described fit between the gudgeon pin 6 and connecting rod 8, a reduced-diameter gudgeon pin 6 can be used in the unit 1, so reducing the alternating masses.

It is apparent that modifications can be made to the unit 1 described and illustrated herein, but without leaving the scope of protection of the present invention.

I claim:

1. An improved piston-connecting rod unit comprising a piston (2) provided with a first seat (5) housing a gudgeon pin (6), and a connecting rod (11) having a small end in which there is provided a second seat (12) into which a first bush (13) is driven to form an interference fit, characterized in that a second bush (7) is idly housed within said first bush (13), and said gudgeon pin (6) is driven into said second bush (7) to form an interference fit therewith.

2. A unit as claimed in claim 1 characterized in said second bush (7) is of greater length than said first bush (13) so as to abut against the inner surface of the side wall (4) of said piston (2) upon axial movement of said gudgeon pin (6), whereby to prevent withdrawal of said gudgeon pin (6) from said first seat 5.

3. A unit as claimed in claim 1, characterized by the absence of spring circlips between said gudgeon pin (6) and said seat (5), whereby to increase the area of contact between said gudgeon pin (6) and said seat (5).

4. A piston-connecting rod unit as claimed in claim 1, characterized in that said gudgeon pin (6) is housed in said seat (5) of the piston (2) with a predetermined radial clearance.

* * * * *